US010464465B2

(12) United States Patent
Huntimer

(10) Patent No.: US 10,464,465 B2
(45) Date of Patent: Nov. 5, 2019

(54) UTV SHELTER

(71) Applicant: Todd M. Huntimer, Arlington, SD (US)

(72) Inventor: Todd M. Huntimer, Arlington, SD (US)

( * ) Notice: Subject to any disclaimer, the term of this patent is extended or adjusted under 35 U.S.C. 154(b) by 144 days.

(21) Appl. No.: 15/867,342

(22) Filed: Jan. 10, 2018

(65) Prior Publication Data
US 2018/0194264 A1 Jul. 12, 2018

Related U.S. Application Data

(60) Provisional application No. 62/445,128, filed on Jan. 11, 2017.

(51) Int. Cl.
*B60P 3/34* (2006.01)
*B60J 5/12* (2006.01)

(52) U.S. Cl.
CPC ............... *B60P 3/34* (2013.01); *B60J 5/125* (2013.01); *B60Y 2200/20* (2013.01)

(58) Field of Classification Search
CPC .......... H02G 3/14; H02G 3/088; H02G 3/185; H02G 3/12; H02G 3/081; B08B 5/02; B08B 7/0035; B08B 7/0092; B24C 1/003; B24C 5/005
USPC ............................................. 296/26.02, 37.6
See application file for complete search history.

(56) References Cited

U.S. PATENT DOCUMENTS

| | | | | |
|---|---|---|---|---|
| 1,964,894 A * | 7/1934 | Rohne | ............. | B60P 3/0257 296/26.02 |
| 3,288,518 A * | 11/1966 | Oliver | ............. | B60P 3/32 296/164 |
| 3,582,129 A * | 6/1971 | Frank | ............. | B60P 3/34 296/164 |
| 3,941,414 A * | 3/1976 | Platt | ............. | B60P 3/34 296/170 |
| 3,966,075 A * | 6/1976 | Schultz | ............. | B65D 88/005 220/1.5 |
| 5,797,224 A * | 8/1998 | Gunthardt | ............. | E04B 1/34305 52/127.11 |
| 6,135,525 A * | 10/2000 | Amann | ............. | B60P 3/34 296/164 |
| 6,302,475 B1 * | 10/2001 | Anderson | ............. | B60P 3/34 296/175 |
| 6,603,660 B1 * | 8/2003 | Ehn | ............. | H04Q 1/14 174/16.1 |
| 6,712,414 B2 * | 3/2004 | Morrow | ............. | B60P 3/34 296/165 |
| 7,717,290 B2 * | 5/2010 | Gerding | ............. | B65D 88/121 220/1.5 |
| 7,828,367 B2 * | 11/2010 | Hickam | ............. | B60P 3/34 296/156 |
| 8,650,806 B1 * | 2/2014 | Condie | ............. | E04H 1/1205 52/79.5 |

(Continued)

*Primary Examiner* — Kiran B Patel
(74) *Attorney, Agent, or Firm* — Lowe Graham Jones PLLC

(57) ABSTRACT

Embodiments are directed to an expandable shelter. The shelter may include a main box, a slide box, and a skirt. The main box may have a side opening. The slide box may be slidably coupled to the main box, with the slide box being slidable at least partially through the side opening of the main box. The skirt may be slidably coupled to the slide box, with the skirt being vertically slidable relative to the slide box.

20 Claims, 9 Drawing Sheets

(56) References Cited

U.S. PATENT DOCUMENTS

| | | | | |
|---|---|---|---|---|
| 9,016,001 B2* | 4/2015 | Heger | ................ | E04B 1/34357 |
| | | | | 52/79.5 |
| 2005/0160682 A1* | 7/2005 | Quadrio | ............... | B65D 88/005 |
| | | | | 52/67 |
| 2010/0024315 A1* | 2/2010 | Pope | .................... | E04B 1/3431 |
| | | | | 52/67 |
| 2010/0269419 A1* | 10/2010 | Gyory | .................. | E04B 1/3444 |
| | | | | 52/79.5 |
| 2012/0006369 A1* | 1/2012 | Cantin | ............... | E04B 1/34305 |
| | | | | 135/96 |
| 2012/0037198 A1* | 2/2012 | Cantin | ................. | E04B 1/3442 |
| | | | | 135/143 |
| 2012/0242103 A1* | 9/2012 | Sidi | .......................... | B60P 3/34 |
| | | | | 296/26.02 |
| 2013/0263527 A1* | 10/2013 | Barrett | .................. | E04B 1/343 |
| | | | | 52/79.1 |
| 2014/0278801 A1* | 9/2014 | Barrett | .............. | G06Q 30/0205 |
| | | | | 705/7.34 |
| 2018/0258658 A1* | 9/2018 | Cruz | .................. | E04B 1/34305 |

* cited by examiner

UTV SHELTER

PRIORITY CLAIM

The present application is a non-provisional utility application of U.S. Provisional Application Ser. No. 62/445,128, entitled UTV SHELTER, filed Jan. 11, 2017, in which the contents are hereby incorporated by reference.

FIELD OF THE INVENTION

This application relates to shelters for use with vehicles and, more particularly, yet not exclusively, outdoor shelters deployable from land vehicles.

BACKGROUND OF THE INVENTION

Ice shanties may be transported to or across frozen lakes with vehicles, such as side-by-side utility terrain vehicles (UTVs). Non-packable shanties must be towed by the vehicle, requiring additional equipment to transport to the shanties. Packable shanties are often transported in a cargo box or space of the vehicle, leaving very little room for other gear or supplies. Thus, it is with regard to these considerations and others that the present invention has been made.

BRIEF DESCRIPTION OF THE DRAWINGS

Non-limiting and non-exhaustive embodiments of the present innovations are described with reference to the following drawings. In the drawings, like reference numerals refer to like parts throughout the various figures unless otherwise specified. For a better understanding of the described innovations, reference will be made to the following Detailed Description of the Preferred Embodiment, which is to be read in association with the accompanying drawings, wherein.

SUMMARY OF THE INVENTION

Figure 1:
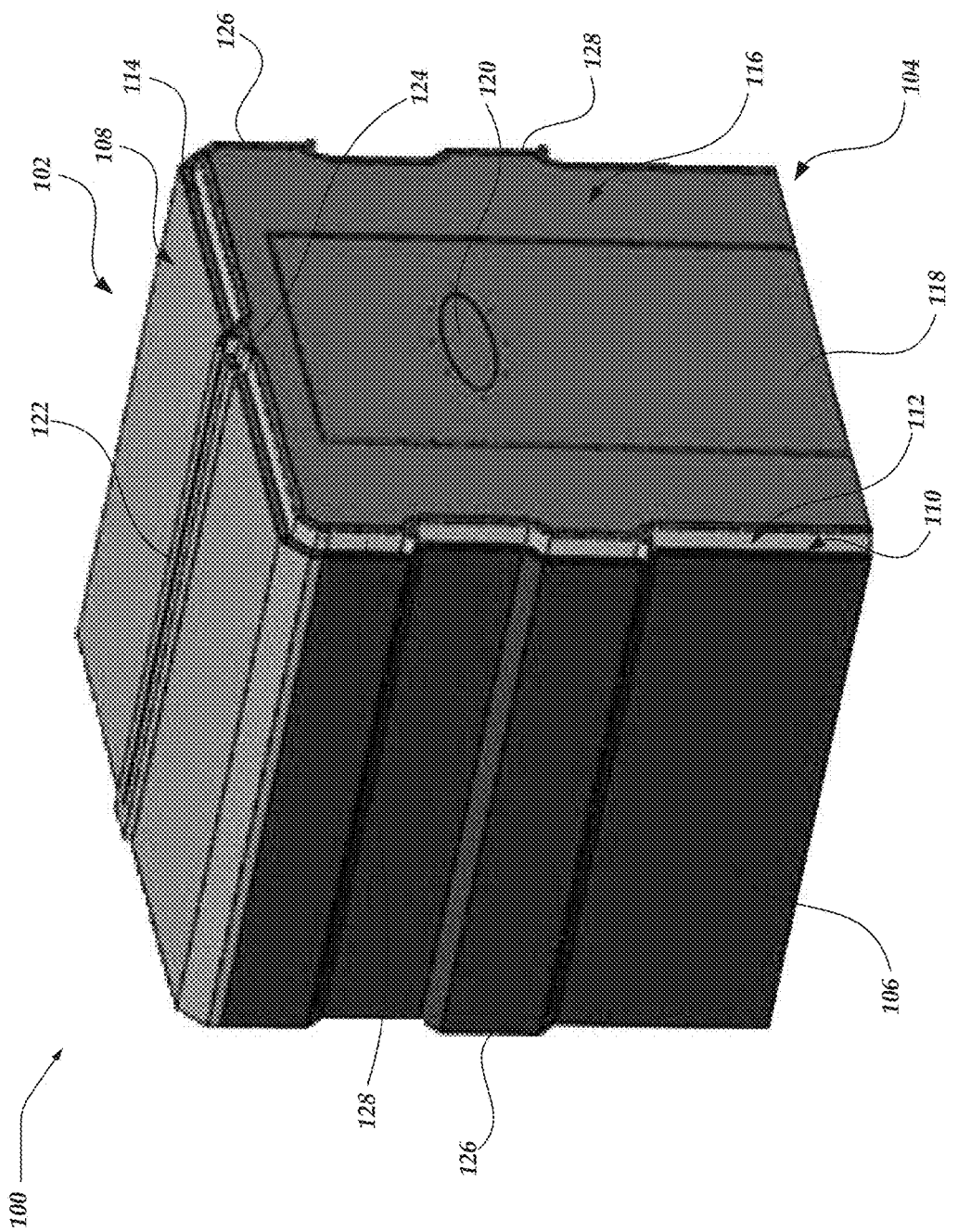
FIG. 1 is an isometric view of an example shelter in a nested configuration with a slide box of the shelter nested in a main box of the shelter, as it would be situated during transportation or storage in a vehicle, such as transportation or storage in a cargo box of a side-by-side utility terrain vehicle (UTV)

The following briefly describes example embodiments of the invention in order to provide a basic understanding of some aspects of the invention. This brief description is not intended as an extensive overview. It is not intended to identify key or critical elements or to delineate or otherwise narrow the scope. Its purpose is merely to present some concepts in a simplified form as a prelude to the more detailed description that is presented later.

Briefly stated, various embodiments are directed to an expandable shelter. In one or more of the various embodiments, the expandable shelter may include a main box having a side opening (the side opening may be a rear side disposed at the rear of the main box, referring to the direction conventions of the vehicle in which it may be placed). In some of the various embodiments, the expandable shelter may include a slide box slidably coupled to the main box, with the slide box being slidable at least partially through the side opening of the main box. In some embodiments, the expandable shelter may include a skirt slidably coupled to the slide box, with the skirt being vertically slidable relative to the slide box.

Also briefly stated, various embodiments are directed to expanding a shelter. In one or more of the various embodiments, a main box may be provided. In some of the various embodiments, the main box may house a slide box. In some embodiments, the slide box may house a skirt. In some embodiments, the main box may have a side opening. In some embodiments, the slide box may have a bottom opening. In some embodiments, the slide box may be at least partially slid out of the side opening of the main box. In some embodiments, the skirt may be at least partially slid out of the bottom opening of the slide box.

In some embodiments, the slide box may be slidable relative to the main box between a nested configuration and an expanded configuration. In some embodiments, the main box, slide box, and skirt may be configured to be transported in a cargo box of a side-by-side utility terrain vehicle (UTV) in the nested configuration.

In some embodiments, the slide box may be slidable relative to the main box between a nested configuration and an expanded configuration. In some embodiments, the skirt may be vertically slidable relative to the slide box in the expanded configuration. In some embodiments, the slide box may have a side opening that is positioned internal to the main box in the expanded configuration. In some embodiments, the side opening of the slide box may pass cargo stored in the main box when the slide box slides between the nested configuration and the expanded configuration.

In some embodiments, the slide box may lack a floor. In some embodiments, the skirt may lack a ceiling.

In some embodiments, the slide box may have a door that provides access to an interior space of the main box.

In some embodiments, the slide box may have a door and a side with a bottom edge. In some embodiments, the door may provide access to an interior space of the main box. In some embodiments, the door may extend entirely to or across the bottom edge.

In some embodiments, the slide box may have a first door that provides access to an interior space of the main box. In some embodiments, the skirt may have a second door that aligns with the first door. In some embodiments, the second door may be coupled to the first door.

In some embodiments, the slide box may be slidable relative to the main box between a nested configuration and an expanded configuration. In some embodiments, the skirt may be slidable relative to the slide box between the expanded configuration and a deployed configuration. In some embodiments, the slide box may have a first door that provides access to an interior space of the main box. In some embodiments, the skirt may have a second door that aligns with the first door. In some embodiments, the second door may be coupled to the first door to provide a double-layer door in the nested and expanded configurations. In some embodiments, the second door may be coupled to the first door to provide a larger door than both of the first and second doors individually in the deployed configuration.

In some embodiments, the slide box may be slidable relative to the main box between a nested configuration and an expanded configuration. In some embodiments, the skirt may be slidable relative to the slide box between the expanded configuration and a deployed configuration. In some embodiments, the slide box may have a door that provides access to an interior space of the main box in the nested, expanded, and deployed configurations. In some embodiments, the slide box may have a window that provides visual access to the interior space of the main box in the deployed configuration. In some embodiments, the window may not provide visual access to the interior space of the main box in the nested and expanded configurations.

In some embodiments, one or more of the main box or the slider box may have longitudinal tracks that slidably couple the slider box to the main box. In some embodiments, one or more of the slider box or the skirt may have tracks that are transverse to the longitudinal tracks and that slidably couple the skirt to the slide box.

DETAILED DESCRIPTION OF THE PREFERRED EMBODIMENTS

The various embodiments now will be described more fully hereinafter with reference to the accompanying drawings, which form a part hereof and show, by way of illustration, specific example embodiments by which the invention may be practiced. The embodiments may, however, be embodied in many different forms and should not be construed as limited to the embodiments set forth herein; rather, these embodiments are provided so that this disclosure will be thorough and complete and will fully convey the scope of the embodiments to those skilled in the art. Among other things, the various embodiments may be methods, systems, or devices. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments may be readily combined, without departing from the scope or spirit of the invention.

In addition, as used herein, the term "or" is an inclusive "or" operator and is equivalent to the term "and/or," unless the context clearly dictates otherwise. The term "based on" is not exclusive and allows for being based on additional factors not described, unless the context clearly dictates otherwise. In addition, the meaning of "a," "an," and "the" include plural references. Also, plural references are intended to also disclose the singular, unless the context clearly dictates otherwise. The meaning of "in" includes "in" and "on." Also, the use of "when" and "responsive to" do not imply that associated resultant actions are required to occur immediately or within a particular e period. Instead, they are used herein to indicate actions that may occur or be performed in response to one or more conditions being met, unless the context clearly dictates otherwise.

Referring to FIG. 1, example shelter 100 is shown in a nested configuration. Shelter 100 may include main box 102 and slide box 104. In the nested configuration, slide box 104 is disposed in or nested in main box 102. In one or more of the various embodiments, main box 102 may have left side wall 106, a right-side wall that is disposed opposite left side wall 106, top wall 108, a bottom wall that is disposed opposite top wall 108, rear opening 110, and a front wall that is disposed opposite rear opening 110. In some of the various embodiments, slide box 104 may have left side wall 112, a right side wall disposed opposite left side wall 112, top wall 114, a bottom wall that is disposed opposite top wall 114, rear wall 116, and a front wall that is disposed opposite rear wall 116. In some embodiments, one or more of main box 102 or slide box 104 may lack one or more of the walls, such as one or more bottom or front walls, and may employ a surface of a vehicle or another surface such as the earth as one or more floors or walls in shelter 100.

As shown in FIG. 1, main box 102 may have an internal width (distance from the inner surface of left wall 106 to the inner surface of the right wall of main box 102) that matches or slightly exceeds the external width of slide box 104 in the nested configuration (distance from the outer surface of left wall 112 to the outer surface of the right wall of slide box 104) to facilitate at least partially receiving slide box 104 in the internal space in main box 102. As illustrated in FIG. 1, main box 102 may have an internal height (distance from the inner surface of top wall 108 to the inner surface of the bottom wall of main box 102 or, in the absence of a bottom wall, the surface employed as the floor of main box 102) that matches or slightly exceeds the external height of slide box 104 in the nested configuration (distance from the outer surface of top wall 114 to the inner surface of the bottom wall of slide box 104 or, in the absence of a bottom wall, the surface employed as the floor of slide box 104 in the nested configuration) to facilitate at least partially receiving slide box 104 in the internal space in main box 102. As shown in FIG. 1, main box 102 may have an internal length (distance from opening 110 to the inner surface of the front wall of main box 102 or, in the absence of a front wall, the surface employed as the front wall of main box 102) that matches or is less than the external length slide box 104 in the nested configuration (distance from the inner surface of rear wall 116 to the front-most external surface of slide box 104 in the nested configuration) to facilitate increasing internal volume in the nested configuration and to facilitate providing easy access to grip slide box 104 to pull slide box 104 to an extended configuration FIG. 2) or a deployed configuration (see FIG. 3).

In one or more of the various embodiments, shelter 100 may have one or more doors, such as door 118 disposed in rear wall 116 of slide box 104, that provide physical access to the interior space of shelter 100. As illustrated in FIG. 1, outer door 112 may extend entirely to or across one or more bottom edges of rear wall 116 in the nested configuration. In some of the various embodiments, shelter 100 may have one or more windows, such as window 120 disposed in door 118, that provide visual access to the interior space of shelter 100 in the nested configuration. As shown in FIG. 1, visual access through one or more windows, such as window 120 may be blocked in the nested configuration and may be unblocked only in one or more other configurations, such as the extended configuration (see FIG. 2) or the deployed configuration (see FIG. 3).

In one or more of the various embodiments, main box 102 may have one or more top corrugations or ridges 122, and slide box 104 may have one or more corresponding top corrugations or ridges 124 that align with one or more top ridges 122 of main box 102. As shown in FIG. 1, one or more top ridges 122 may form one or more tracks that may receive one or more corresponding top ridges 124 of slide box 104, thereby facilitating laterally aligning the longitudinal axis of slide box 104 with the longitudinal axis of main box 102 and improving ease of sliding slide box 104 in and out of main box 102. In some embodiments, main box 102 may have one or more side corrugations or ridges 126, and slide box 104 may have one or more corresponding side corrugations or ridges 128 that align with one or more side corrugations 126 of main box 102. As illustrated in FIG. 1, one or more side corrugations 126 may receive one or more corresponding side corrugations 128 of side box 104, thereby facilitating vertically aligning the longitudinal axis of slide box 104 with the longitudinal axis of main box 102 and improving ease of sliding slide box 104 in and out of main box 102. As shown in FIG. 1, each top ridge 122 and side corrugation 126 of main box 102 may have an internal size that is slightly larger than the external size of each top ridge 124 and side corrugation 128 of slide box 104 to facilitate receiving each corresponding top ridge 124 and side corrugation 128 of slide box 104.

Figure 5:
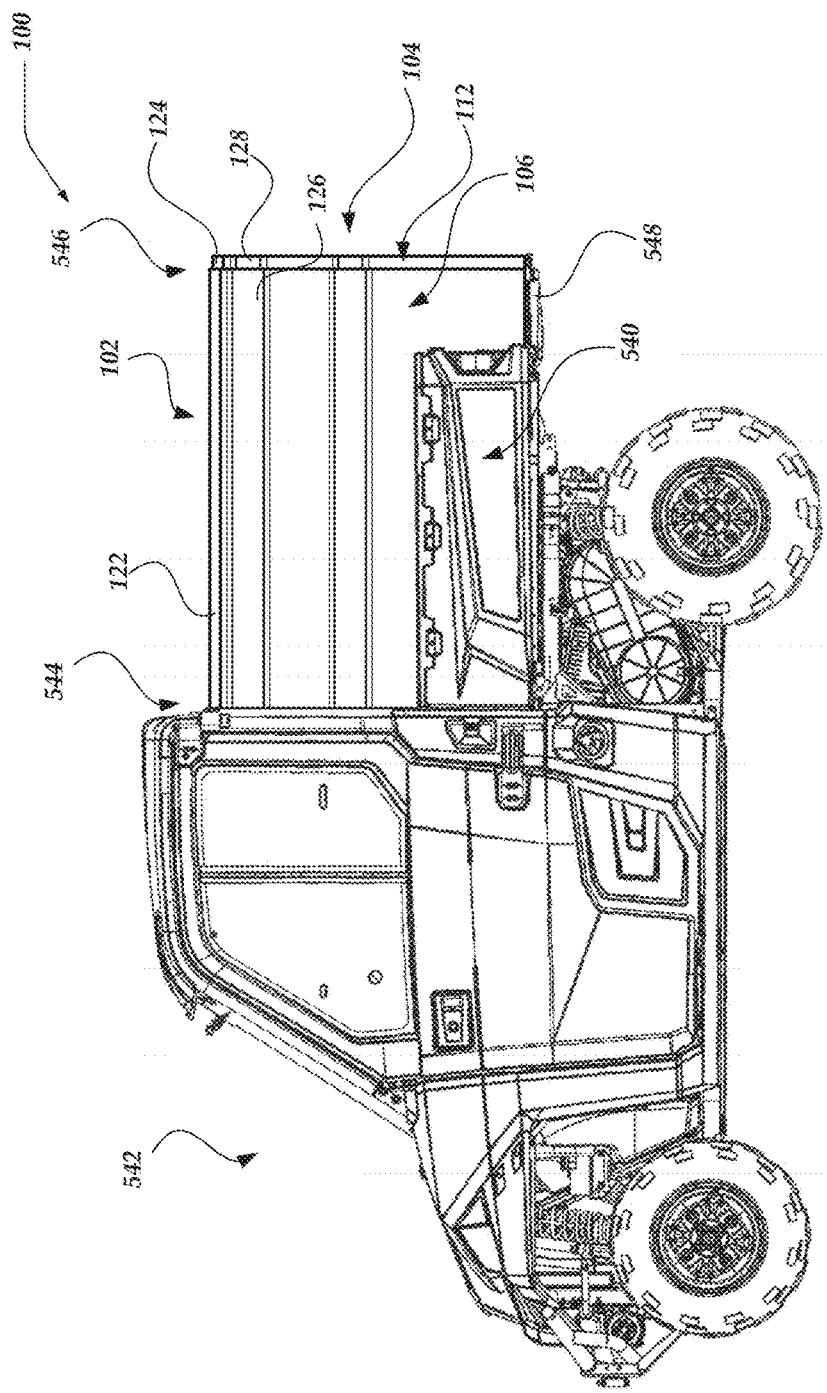
FIG. 5 is an isometric side view of the shelter of FIG. 1 in the nested configuration, positioned in a cargo box of an example side-by-side UTV.
Figure 8:
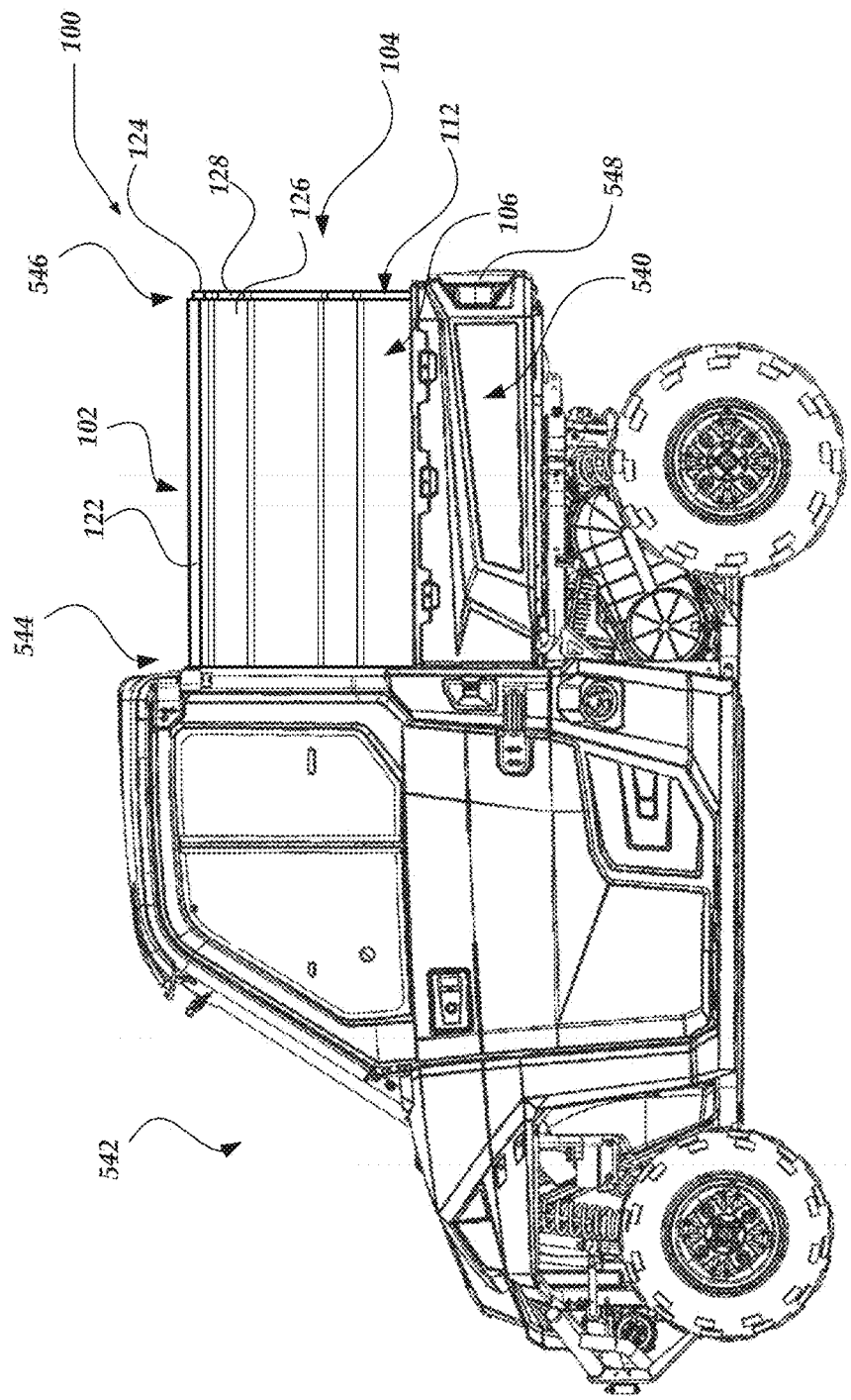
FIG. 8 is an isometric side view of the shelter of FIG. 1 in the nested configuration, positioned in a cargo box of the side-by-side UTV of FIG. 5, with the shelter being sized and dimensioned to fit in the cargo box in the nested configuration with the tailgate closed.

In one or more of the various embodiments, shelter 100 in the nested configuration may provide a cap or shell for a vehicle, such as a side-by-side utility terrain vehicle (UTV) (see FIGS. 5 and 8). Shelter 100 may be configured and sized to fit within the cargo box of a UTV and to be deployable therefrom when the UTV is stopped so as to provide a shelter. Such a shelter may be used, for example, as an ice house for fishing, as a hunting blind, or as a warming hut when expanded beyond the cargo box of the UTV. When in the nested configuration shown in FIG. 1, shelter 100 fits in the cargo box of the UTV and may be used to hold cargo. Thus, for most UTV cargo boxes, the width and depth of shelter 100 may be 48 inches by 48 inches. With these dimensions, shelter 100 in the nested configuration may fit in the cargo boxes of most UTVs currently on the market, at least with the tailgate of the UTV open (see FIG. 5). If the particular cargo box is longer than 48 inches, shelter 100 may be positioned at the rear of the box for ease of deployment.

Shelter 100 may be tapered or otherwise adapted or configured to fit the specific size of a certain IAN cargo box, as needed. Shelter 100 may also be sized to fit within a smaller or larger vehicle, such as a pickup truck. The height of shelter 100 is preferably also 48 inches, but may alternatively be shorter or taller. Anchors may be used to secure shelter 100 fixedly in the cargo box. For example, bolts or straps may be used to secure shelter 100 in the cargo box fixedly or even temporarily.

While in the cargo box of the UTV, items for transport (i.e., cargo) may be placed in shelter 100 through door 118. Deployment of slide box 104 from main box 102 does not necessarily require such cargo to be removed from the cargo box, as will be described below.

Shelter 100 is preferably constructed of sheet aluminum with riveted connections between panels. Other materials on constructions may alternatively be employed, such as roto-molded plastic. Door 118 may be hinged in any conventional manner, such as with a piano hinge. Door 118 may be used with slide box 104 nested as in FIG. 1 or with slide box 104 partially or fully extended or deployed as in FIGS. 2-4). Windows 120 may be provided in door 118 or sides of main box 104. Main box 102 preferably includes three sides (a front side, a right side, and a left side) as well as a top. Main box 102 may also have a floor and/or a back side in some alternate embodiments.

Figure 2:
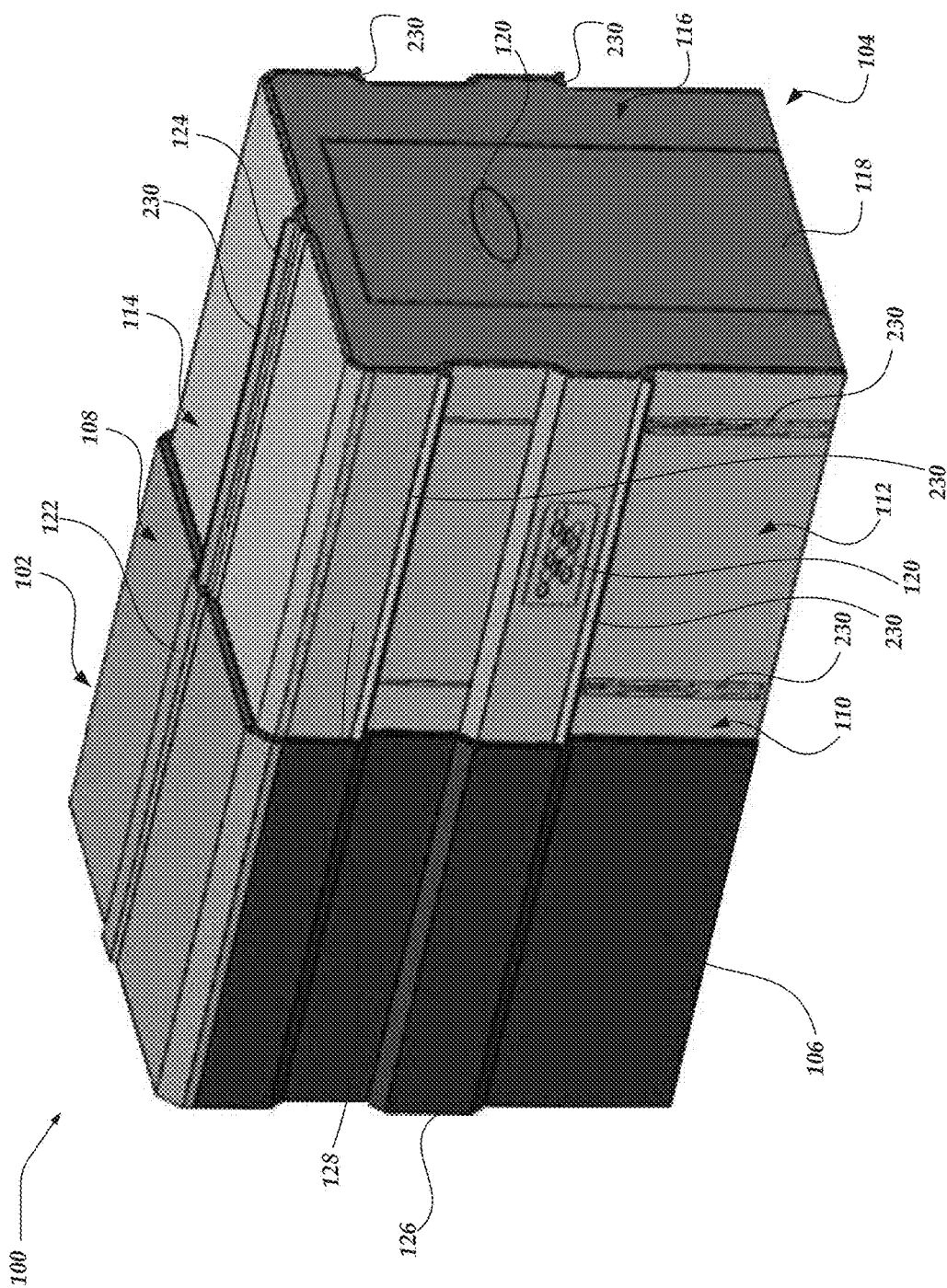
FIG. 2 is an isometric view of the shelter of FIG. 1 in an extended configuration, with the slide box extended from the main box of the shelter.

FIG. 2 shows shelter 100 in the extended configuration, with slide box 104 extended (pulled out) from main box 102. As shown in FIG. 2, the ridges and recesses of slider box 104 generally match and nest within those of main box 102. Such a configuration aligns slide box 104 with main box 102 for ease of deployment and retraction. Slots may be provided in main box 102 to receive the ridges of slide box 104. As illustrated in FIG. 2, the slots may include one or more longitudinal tracks, such as one or more roller or low-friction tracks 230. In some embodiments, main box 102 may have one or more corresponding rollers or low-friction tracks that act in conjunction with one or more roller or low-friction tracks 230 of slide box 104 to facilitate sliding slide box 104 relative to main box 102.

An ultra-high molecular weight (UHMW) plastic may be used within some or all of the slots to facilitate low-friction sliding while still providing alignment. Windows 120 may be provided in slide box 104. In one or more of the various embodiments, windows 120 may match up with windows in main box when in the nested configuration of FIG. 1. In some of the various embodiments, the windows may be open, have mesh or other venting material covering them as shown in FIG. 2, or have a pane of translucent material covering them. Open windows (or turrets) may be used for hunting, the user being able to extend a rifle through the turret, for example when the shelter is used as a hunting blind.

In one or more of the various embodiments, slide box 104 lacks a front wall in the nested and extended configurations, there by facilitating the slide box 104 sliding at least partially out of main box 102 without upsetting cargo in the interior space of shelter 100. For example, in the nested configuration, slide box 104 may have a bottom wall that slides rearward with the rest of slide box 104 to the extended configuration and, from the extended configuration, hinges or otherwise orients to become a vertical front wall below slide box 104 when shelter 100 is in the deployed configuration (see FIG. 3, providing a skirt having a front wall in the deployed configuration while slide box 104 lacks a front wall in the nested or extended configuration). Thus, with shelter 100 in the extended configuration, the uninterrupted interior volume is nearly doubled. A permanent floor is preferably not included with slide box 104 because slide box 104 may at least partially extend beyond the rear of the vehicle in the deployed configuration and may provide cover for a user standing on the ground behind the vehicle. Not shown in FIG. 2 are legs that may drop down to the ground when slide box 104 is extended from the shell. Also, not shown is an optional support member that may extend from a hitch receiver of the vehicle to support the vehicle from suspension compression when slide box 104 is deployed.

As with main box 102, slide box 104 is preferably constructed of aluminum with panels riveted together. Other materials and constructions may alternatively be employed.

The interface between main box 102 and slide box 104 preferably includes flanges and seals. The flanges on slide box 104 may flare outwardly, while the flanges on main box 102 may flare inwardly such that the two interface each other at full extension of slide box 104 in the extended configuration and deployed configuration. The flanges other stopper) may maintain some overlap between main box 102 and slide box 104 to maintain structural integrity when in the extended configuration and deployed configuration shown in FIGS. 2-4. Seals (such as rubber) may also be used between main box 102 and slide box 104 to improve the integrity of shelter 100.

Figure 3:
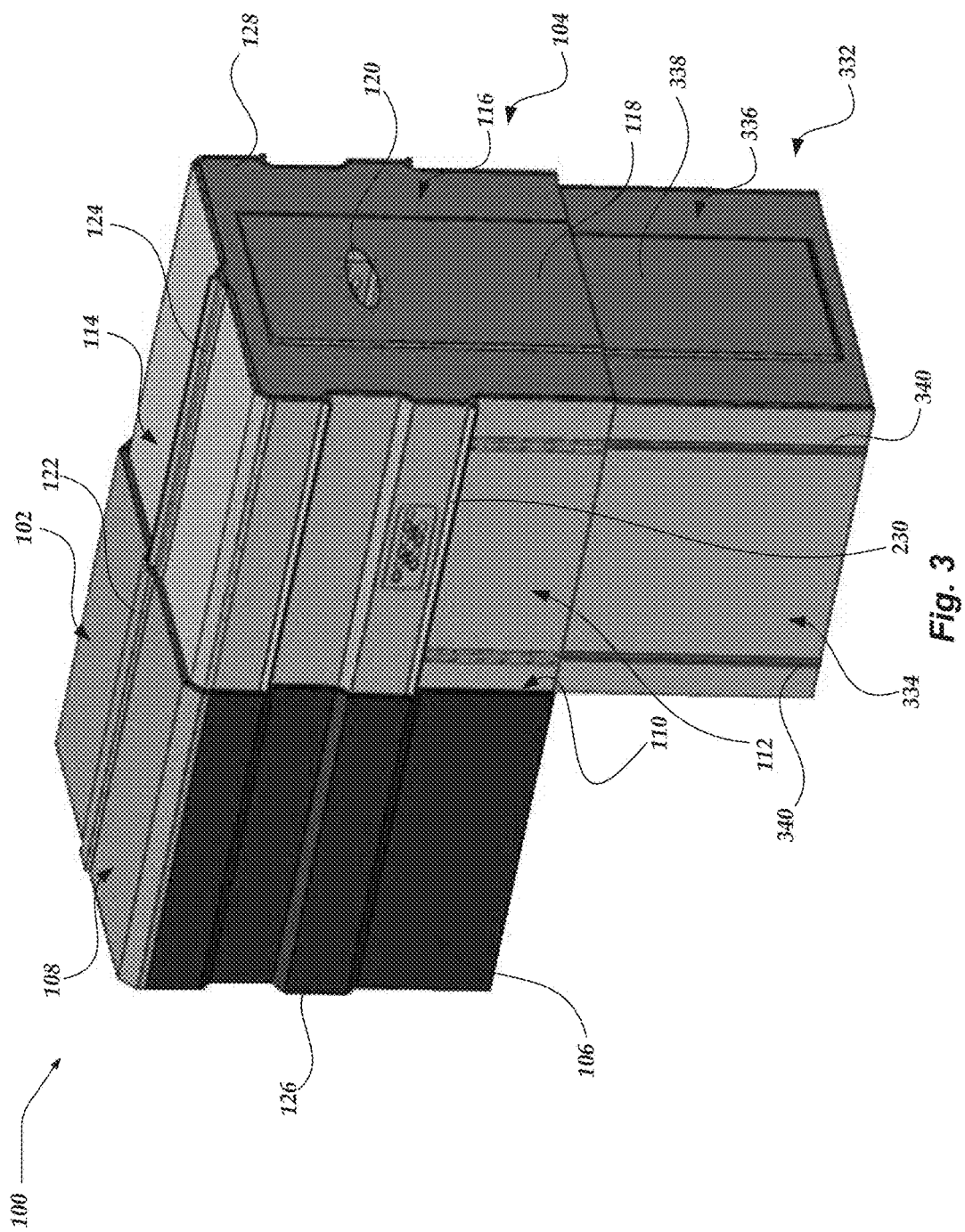
FIG. 3 is an isometric view of the shelter of FIG. 1 in a deployed configuration, with a skirt of the shelter deployed from the slide box.

FIG. 3 illustrates shelter 100 in the deployed configuration, with skirt 332 of shelter 100 extended downward from slide box 104. In one or more of the various embodiments, skirt 332 may have left side wall 334, a right-side wall that is disposed opposite left side wall 334, rear wall 336, a front wall that is disposed opposite rear wall 336, and a bottom wall that is disposed opposite top wall 114 of slide box 104. In some of the various embodiments, skirt 332 may lack one or more of the walls, such as one or more bottom or front walls.

As shown in FIG. 3, slide box 104 may have an internal width (distance from the inner surface of left wall 112 to the inner surface of the right wall of slide box 104) that matches or slightly exceeds the external width of skirt 332 (distance from the outer surface of left wall 334 to the outer surface of the right wall of skirt 332) to facilitate at least partially receiving skirt 332 in the internal space in slide box 104. As illustrated in FIGS. 1-3, slide box 104 may have an internal height (distance from the inner surface of top wall 114 to the bottom-most internal surface of slide box 104 in the deployed configuration) that matches or slightly exceeds the external height of skirt 332 in the nested or extended configuration (distance from top-most surface of skirt 332 to the inner surface of the bottom wall of skirt 332 or, in the absence of a bottom wall, the surface employed as the floor of skirt 332 in the deployed configuration) to facilitate at least partially receiving skirt 332 in the internal space in slide box 104. In other embodiments, the external height of skirt 332 may exceed the internal height of slide box 104 while remaining less than or equal to the internal height of main box 102. As shown in FIGS. 1-3, slide box 104 may have an internal length (distance from the inner surface of front wall 116 to the front-most inner surface of slide box 104) that matches or is less than the external length skirt 332 in the nested or extended configuration (distance from the inner surface of rear wall 336 to the front-most external surface of skirt 332 in the nested or extended configuration).

In one or more of the various embodiments, skirt 332 may have one or more doors, such as door 338 disposed in front wall 336 of slide box 332, that provide physical access to the interior space of shelter 100 in at least the deployed configuration. As shown in FIG. 3, door 338 of skirt 332 aligns with door 118 of slide box 104 in the deployed configuration to provide a larger door that is a combination of doors 338 and 118. As shown in FIGS. 1-3, door 338 of skirt 332 also aligns with door 118 of slide box 104 in the nested or extended configuration to provide a double-layer door and to block visual access to the interior space of shelter 100 through window 120.

In one or more of the various embodiments, one or more of slide box 104 or skirt 332 may have one or more vertical slots that receive one or more vertical ridges of the other. As shown in FIG. 3, the slots may include one or more vertical tracks, such as one or more roller or low-friction tracks 340. In some embodiments, one or more of slide box 104 or skirt 332 may have one or more corresponding rollers or low-friction tracks that act in conjunction with one or more roller or low-friction tracks 340 of the other to facilitate sliding skirt 332 relative to slide box 104.

Left wall 334, the right wall, and rear wall 336 of skirt 332 are preferably 32 inches tall. Skirt 332 may retract up into slide box 104 when not in use. Other support walls and/or bracing may be included, such as on the front side of skirt 332 to provide structural integrity to skirt 332. However, skirt 332 preferably provides clearance to deploy and retract without removal of cargo in the rear of the UTV. Thus, any such braces or walls may be configured to be out of the way of the cargo or to be moveable to not interfere with the cargo during extension and retraction. Preferably at least a partial upper wall (8-10 inches) is provided across the front of skirt 332. The front wall may provide structure without substantial interference with the cargo in the UTV box when skirt 332 is slid within main box 102 along with slide box 104 when transitioning shelter 100 between the nested configuration and the expanded configuration.

As skirt 332 is extended vertically into or from slide box 104, the vertical slots may cooperate to maintain proper alignment of skirt 332 relative slide box 104. The vertical slots may include ridges and corresponding tracks or grooves, one or more of which may include UHMW as between slide box 104 and main box 102. When the above-mentioned legs are employed to provide support to slide box 104, skirt 332 does not need to do so yet may optionally lock into place in the deployed configuration to provide additional support to slide box 104. Flanges may be used between skirt 332 and slide box 104 in a manner similar to that discussed above in connection with the interface between main box 102 and slide box 104. Skirt 332 may extend to and be supported by the ground, or skirt 332 may be configured to extend to a position above and spaced apart from the ground, supported and held above the ground by the interface with the slider. Such positioning may depend on the box height of the UTV and the slope of the ground.

Skirt 332 does not need to carry the load of slider 104 or main box 102 but does provide protection from the elements to shelter the user. A lock is preferably provided such that skirt 332 cannot be deployed unless the legs and/or hitch support is in place. A lock may also be provided such that door 118 cannot be opened unless the legs or hitch support is in place.

Figure 4:
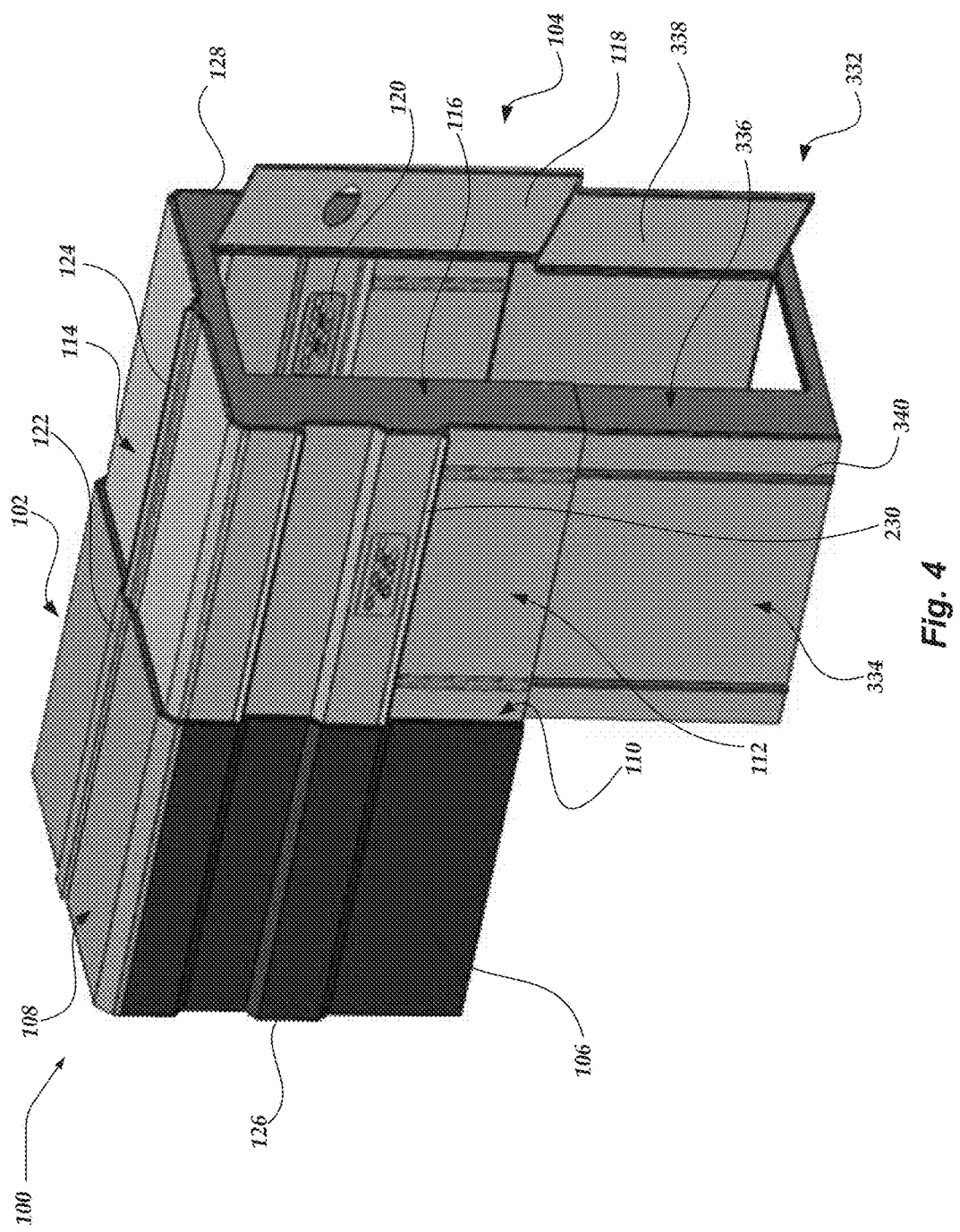
FIG. 4 is an isometric view of the shelter of FIG. 1 in the deployed configuration, with doors of the shelter being open.

As shown in FIG. 4, door 338 of skirt 332 may align with door 118 of slide box 104 such that they can be opened together, whether skirt 332 is deployed or not.

Shelter 100 may be used as an ice-fishing shelter, as a hunting blind, as a warming hut, or as any other shelter for a person or for cargo or gear. In some embodiments, shelter 100 may deploy quickly and easily without the need to remove normal cargo from the box of the UTV. A pin or other locking device can be removed, the hitch jack secured, and shelter 100 deployed within seconds. Shelter 100 may ride in the box of the UTV and may be ready for quick and easy use when desired.

Figure 6:
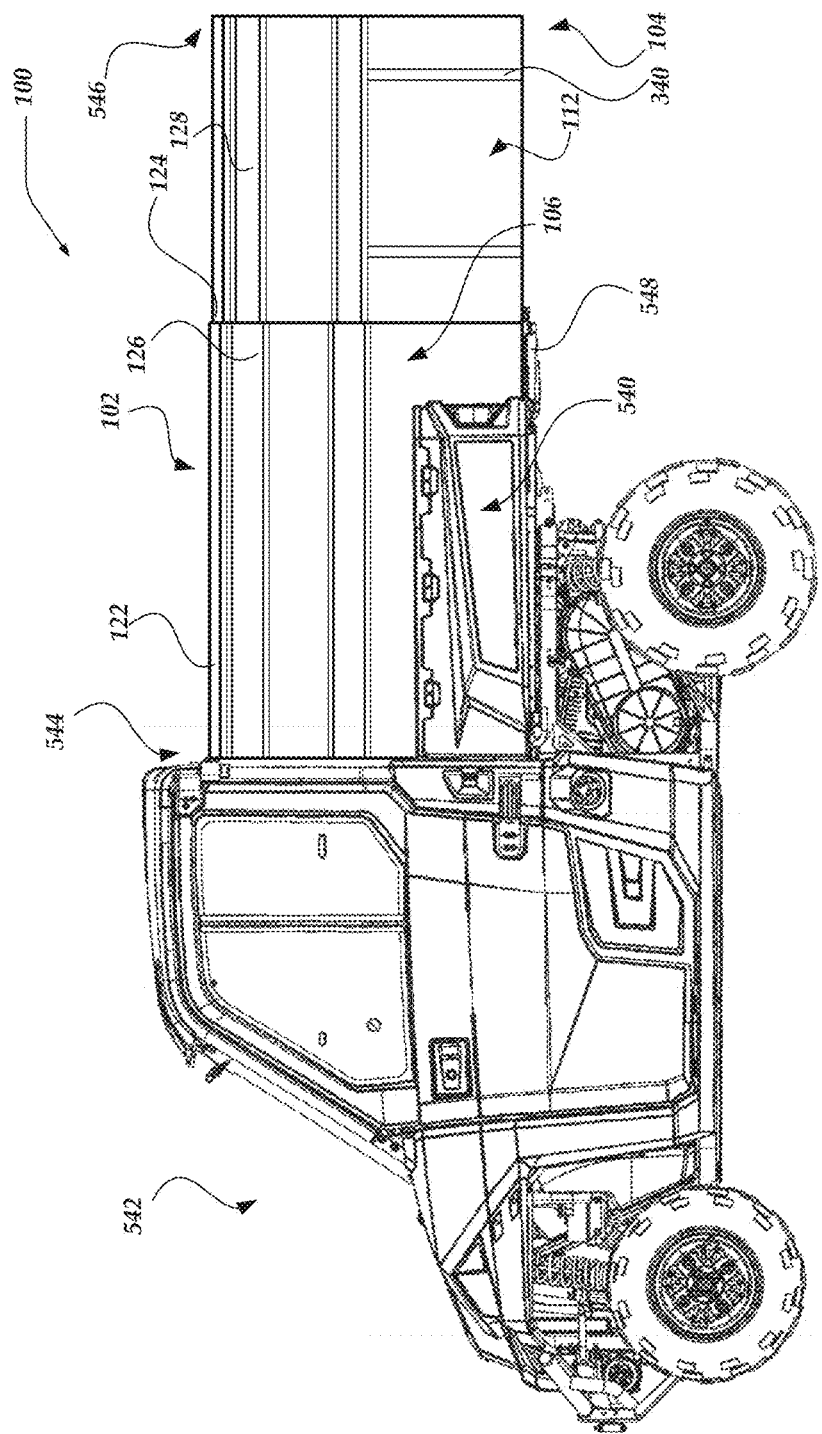
FIG. 6 is an isometric side view of the shelter of FIG. 5 in the extended configuration, positioned in the cargo box of the side-by-side UTV of FIG. 5.
Figure 7:
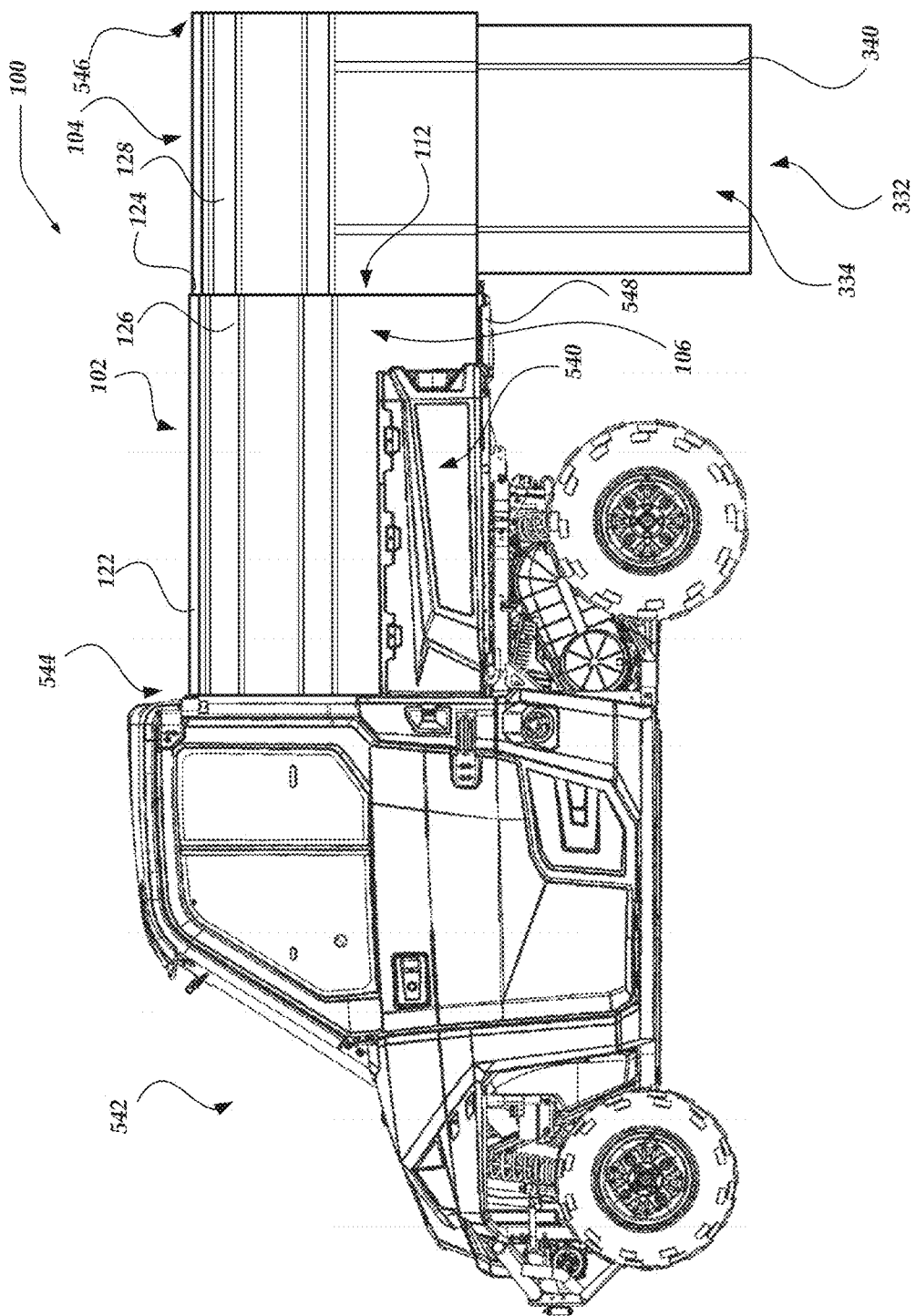
FIG. 7 is an isometric side view of the shelter of FIG. 6 in the deployed configuration, positioned in the cargo box of the side-by-side UTV of FIG. 5.

FIG. 5 is an example side view of shelter 100 in the nested configuration, positioned in cargo box 540 of example side-by-side UTV 542. As shown in FIG. 5, shelter 100 is sized and dimensioned such that, when front end portion 544 of shelter 100 abuts the front-most portion of cargo box 540, rear end portion 546 of shelter 100 in the nested configuration aligns with the rear-most portion of tailgate 548 of LTV 542 in the open configuration, FIG. 6 shows shelter 100 in the extended configuration in UTV 542. FIG. 7 shows shelter 100 from the example of FIG. 5 in the deployed configuration in UTV 542. As shown in FIG. 7, skirt 332 is sized and dimensioned and positioned relative to slide box 104 to facilitate transitioning to the deployed configuration without moving main box 102 relative to cargo box 540.

Figure 9:
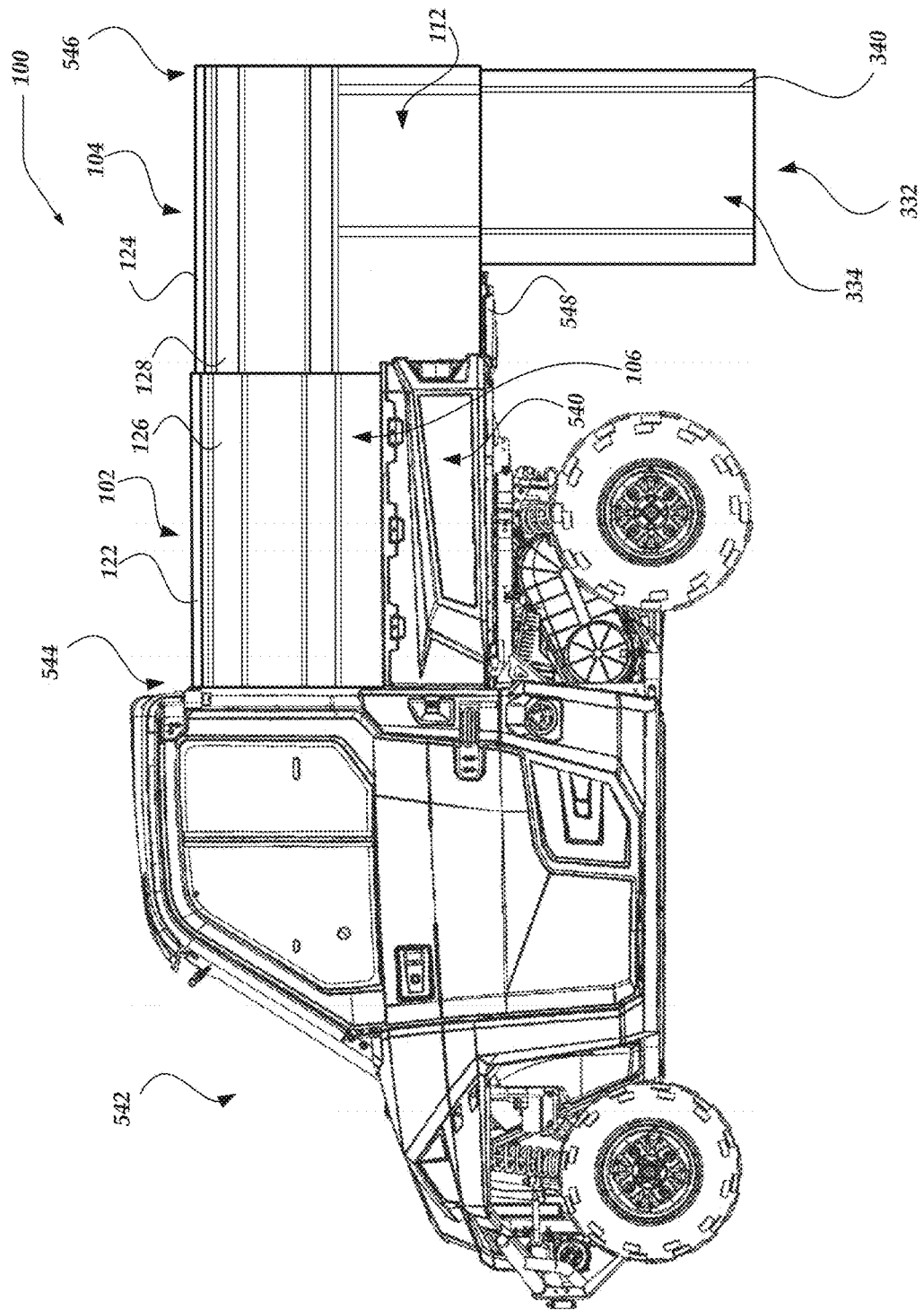
FIG. 9 is an isometric side view of the shelter of FIG. 8 in the deployed configuration, positioned in the cargo box of the side-by-side UTV of FIG. 8.

FIG. 8 is another example side view of shelter 100 in the nested configuration, positioned in cargo box 540 of UTV 542. As shown in FIG. 8, shelter 100 is sized and dimensioned such that, when front end portion 544 of shelter 100 abuts the front-most portion of cargo box 540, rear end portion 546 of shelter 100 in the nested configuration fits in cargo box 540 of UTV 542 with tailgate 548 of UTV 542 in the closed configuration. FIG. 9 shows shelter 100 from the example of FIG. 8 in the deployed configuration in UTV 542. As shown in FIG. 9, skirt 332 is sized and dimensioned and positioned relative to slide box 104 to facilitate transitioning to the deployed configuration without moving main box 102 relative to cargo box 540. In the examples shown in FIGS. 8 and 9, tailgate 548 may be opened prior to transitioning shelter 100 from the nested configuration to the extended or deployed configuration and may be closed after returning shelter 100 to the nested configuration.

The terms "front," "rear," "top," "bottom," "frontward," and "rearward" are used consistently with respect to all elements and are defined relative to rear face 116 of shelter 100. The terms "longitude," "longitudinal," "lateral," "width," and "height" are also used consistently with respect to all elements and are defined relative to the longitudinal axis of shelter 100. The longitudinal axis of shelter 100 extends from rear face 116 to the front-most portion of shelter 100. The lateral axis of shelter 100 is perpendicular to the longitudinal axis of shelter 100. The width of shelter 100 is transverse to the longitudinal axis of shelter 100 (for example, parallel to the lateral axis of shelter 100) and, when disposed on a flat surface, is parallel to the flat surface. The height of shelter 100 is transverse to the longitudinal axis and the width of shelter 100.

The foregoing examples should not be construed as limiting or exhaustive, yet rather, illustrative use cases to show implementations of at least one of the various embodiments of the invention. According any changes can be made without departing from the spirit and scope of the invention. For example, although the figures show slide box 104 extending rearward of main box 102, main box 102 may have a left-side or right-side opening to facilitate extending slide box 104 to the left or right side of main box 102 and over the upper side edge of cargo box 540 (instead of over lowered tailgate 548). Thus, the scope of the invention is not limited by the disclosure of the examples. Instead, the invention should be determined entirely by reference to the claims that follow.

The invention claimed is:

1. An expandable shelter, comprising:
 a main box having a side opening;
 a slide box slidably coupled to the main box, with the slide box being slidable at least partially through the side opening of the main box; and
 a skirt slidably coupled to the slide box, with the skirt being vertically slidable relative to the slide box.

2. The expandable shelter of claim 1, wherein the slide box is slidable relative to the main box between a nested configuration and an expanded configuration, and the main box, slide box, and skirt are configured to be transported in a cargo box of a side-by-side utility terrain vehicle (UTV) in the nested configuration.

3. The expandable shelter of claim 1, wherein the slide box is slidable relative to the main box between a nested configuration and an expanded configuration, the skirt is vertically slidable relative to the slide box in the expanded configuration, the slide box has a side opening that is positioned internal to the main box in the expanded configuration, and the side opening of the slide box passes cargo stored in the main box when the slide box slides between the nested configuration and the expanded configuration.

4. The expandable shelter of claim 1, wherein the slide box lacks a floor, and the skirt lacks a ceiling.

5. The expandable shelter of claim 1, wherein the slide box has a door that provides access to an interior space of the main box.

6. The expandable shelter of claim 1, wherein the slide box has a door and a side with a bottom edge, the door providing access to an interior space of the main box and extending entirely to or across the bottom edge.

7. The expandable shelter of claim 1, wherein:
 the slide box has a first door that provides access to an interior space of the main box; and
 the skirt has a second door that aligns with the first door, the second door being coupled to the first door.

8. The expandable shelter of claim 1, wherein:
 the slide box is slidable relative to the main box between a nested configuration and an expanded configuration;
 the skirt is slidable relative to the slide box between the expanded configuration and a deployed configuration;
 the slide box has a first door that provides access to an interior space of the main box; and
 the skirt has a second door that aligns with the first door, the second door being coupled to the first door to provide a double-layer door in the nested and expanded configurations and to provide a larger door than both of the first and second doors individually in the deployed configuration.

9. The expandable shelter of claim 1, wherein:
 the slide box is slidable relative to the main box between a nested configuration and an expanded configuration;
 the skirt is slidable relative to the slide box between the expanded configuration and a deployed configuration;
 the slide box has a door that provides access to an interior space of the main box in the nested, expanded, and deployed configurations; and
 the slide box has a window that provides visual access to the interior space of the main box in the deployed configuration and does not provide visual access to the interior space of the main box in the nested and expanded configurations.

10. The expandable shelter of claim 1, wherein one or more of the main box or the slider box have longitudinal tracks that slidably couple the slider box to the main box, and one or more of the slider box or the skirt have tracks that are transverse to the longitudinal tracks and that slidably couple the skirt to the slide box.

11. A method of expanding a shelter, comprising:
 providing a main box that houses a slide box that houses a skirt, the main box having a side opening, the slide box having a bottom opening;
 sliding the slide box at least partially out of the side opening of the main box; and
 vertically sliding the skirt at least partially out of the bottom opening of the slide box.

12. The method of claim 11, wherein the slide box is slidable relative to the main box between a nested configuration and an expanded configuration, and the main box, slide box, and skirt are configured to be transported in a cargo box of a side-by-side utility terrain vehicle (UTV) in the nested configuration.

13. The method of claim 11, wherein the slide box is slidable relative to the main box between a nested configuration and an expanded configuration, the skirt is vertically slidable relative to the slide box in the expanded configuration, the slide box has a side opening that is positioned internal to the main box in the expanded configuration, and the side opening of the slide box passes cargo stored in the main box when the slide box slides between the nested configuration and the expanded configuration.

14. The method of claim 11, wherein the slide box lacks a floor, and the skirt lacks a ceiling.

15. The method of claim 11, wherein the slide box has a door that provides access to an interior space of the main box.

16. The method of claim 11, wherein the slide box has a door and a side with a bottom edge, the door providing access to an interior space of the main box and extending entirely to or across the bottom edge.

17. The method of claim 11, wherein:
the slide box has a first door that provides access to an interior space of the main box; and
the skirt has a second door that aligns with the first door, the second door being coupled to the first door.

18. The method of claim 11, wherein:
the slide box is slidable relative to the main box between a nested configuration and an expanded configuration;
the skirt is slidable relative to the slide box between the expanded configuration and a deployed configuration;
the slide box has a first door that provides access to an interior space of the main box; and
the skirt has a second door that aligns with the first door, the second door being coupled to the first door to provide a double-layer door in the nested and expanded configurations and to provide a larger door than both of the first and second doors individually in the deployed configuration.

19. The method of claim 11, wherein:
the slide box is slidable relative to the main box between a nested configuration and an expanded configuration;
the skirt is slidable relative to the slide box between the expanded configuration and a deployed configuration;
the slide box has a door that provides access to an interior space of the main box in the nested, expanded, and deployed configurations; and
the slide box has a window that provides visual access to the interior space of the main box in the deployed configuration and does not provide visual access to the interior space of the main box in the nested and expanded configurations.

20. The method of claim 11, wherein one or more of the main box or the slider box have longitudinal tracks that slidably couple the slider box to the main box, and one or more of the slider box or the skirt have tracks that are transverse to the longitudinal tracks and that slidably couple the skirt to the slide box.

* * * * *